United States Patent
Zaima et al.

(10) Patent No.: US 6,527,843 B1
(45) Date of Patent: Mar. 4, 2003

(54) FINE COLORED PARTICLES AND INK JET INK

(75) Inventors: Hiroaki Zaima, Kyoto (JP); Hideo Matsui, Takatsuki (JP)

(73) Assignee: Kansai Research Institute, Inc., Kyoto (JP)

( * ) Notice: Subject to any disclaimer, the term of this patent is extended or adjusted under 35 U.S.C. 154(b) by 0 days.

(21) Appl. No.: 09/705,283

(22) Filed: Nov. 2, 2000

(30) Foreign Application Priority Data

Nov. 2, 1999 (JP) ............................. 11-312740

(51) Int. Cl.$^7$ ............................. C09D 11/02; C08K 9/10
(52) U.S. Cl. .............................. 106/31.33; 106/31.13; 106/31.25; 106/31.27; 106/287.18; 106/287.19; 106/1.22; 523/161; 523/200; 523/205; 523/212; 427/216; 427/220; 428/402; 428/403
(58) Field of Search ............................ 106/1.22, 31.13, 106/31.25, 31.27, 31.33, 287.18, 287.19; 427/216, 220; 428/402, 403; 523/161, 200, 205, 212

(56) References Cited

U.S. PATENT DOCUMENTS

| | | | |
|---|---|---|---|
| 4,692,188 A | | 9/1987 | Ober et al. |
| 5,087,603 A | * | 2/1992 | Izubayashi et al. .......... 503/226 |
| 5,854,307 A | * | 12/1998 | Kimura et al. ............... 523/161 |
| 5,922,403 A | * | 7/1999 | Tecle ........................... 427/212 |
| 5,973,025 A | * | 10/1999 | Nigam et al. ................ 523/160 |
| 6,232,369 B1 | * | 5/2001 | Ma et al. ...................... 523/161 |
| 6,245,832 B1 | * | 6/2001 | Suzuki et al. ................ 523/160 |
| 6,262,152 B1 | * | 7/2001 | Fryd et al. ..................... 524/90 |

FOREIGN PATENT DOCUMENTS

| | | |
|---|---|---|
| EP | 0 272 649 A2 | 12/1987 |
| JP | 62-95366 | 5/1987 |
| JP | 6-313141 | 11/1994 |
| JP | 7-47696 | 2/1995 |
| JP | 9-71732 | 3/1997 |

* cited by examiner

Primary Examiner—Robert Dawson
Assistant Examiner—Jeffrey B. Robertson
(74) Attorney, Agent, or Firm—Webb Ziesenheim Logsdon Orkin & Hanson, P.C.

(57) ABSTRACT

Fine colored particles include a dye adsorbed on metal oxide fine particles having a nanometer size, and stabilized with an organic compound having an ionic group. Thus, fine colored particle having a nanometer size having good color properties, transparency and storage stability can be produced with high reproducibility.

31 Claims, No Drawings

FINE COLORED PARTICLES AND INK JET INK

BACKGROUND OF THE INVENTION

1. Field of the Invention

The present invention relates to fine colored particles having good dispersibility and ink jet ink including the same.

2. Description of the Related Art

Dye ink has excellent transparency, high definition and good color development properties, and therefore dye ink is used as an ink for applications requiring high definition. However, dye ink has problems with regard to water resistance and light resistance. In order to solve these problems, inks using organic pigments or carbon black in place of the dye are produced.

However, for inks using organic pigments or carbon black, the organic pigments or carbon black are pulverized and dispersed mechanically with the help of a dispersant. Without pulverizing the organic pigments or the carbon black into fine particles and dispersing them stably in a medium, good transparency, high definition and good color development properties cannot be obtained, and in addition, problems with respect to, for example, secondary aggregation and storage stability may be caused. Furthermore, insufficient pulverization and dispersion may cause clogging of nozzles in ink jet ink applications.

On the other hand, mechanically making the particle size of the organic pigment or the carbon black very small requires a large amount of energy because then the surface energy becomes large. In addition, various efforts are required to prevent secondary aggregation and maintain the dispersion stability.

In order to solve these problems, the following methods were proposed as alternatives to the conventional method of pulverizing and dispersing the organic pigment or the carbon black with the help of a dispersant: using microcapsulated fine colored particles containing dye as ink (Japanese Laid-Open Patent Publication No. 62-95366); using colored emulsion polymerized particles as ink (Japanese Laid-Open Patent Publication No. 6-313141); obtaining lake pigment fine particles using a W/O emulsion (Japanese Patent Publication No. 7-47696); and making a colorant by adsorbing a dye onto porous ceramic fine particles (Japanese Laid-Open Patent Publication No. 9-71732).

However, the microcapsulated fine colored particles containing dye and the colored emulsion polymerized particles have a large particle size, and therefore have problems in the transparency and the definition degree and the color development properties. Furthermore, the concentration of a coloring material contained therein is low, so that the coloring ability is not sufficient.

The lake pigment fine particles prepared using a W/O emulsion employs emulsion, and therefore it is difficult to obtain particles as fine as several tens of nanometers with a high reproducibility, and the distribution of the particle size of the obtained particles is large. When the distribution of the particle size of the obtained particles is large, the saturation is deteriorated. Moreover, the production process is complicated.

To make a colorant by adsorbing a dye on porous ceramic fine particles, a particle aggregate produced by, for example, a sol-gel method is pulverized and used for the colorant. In this case, it is difficult to obtain a colorant comprising particles having a very small particle size and a narrow particle size distribution. Furthermore, the production process is complicated because it includes the steps of producing porous ceramic fine particles and then adsorbing a dye thereon.

Furthermore, when porous particles on which a dye is adsorbed are dispersed in a liquid medium to prepare ink, since the adsorption of the dye is only physical adsorption, the adsorbed dye may be desorbed again due to a change in the pH of the liquid medium or addition of a surfactant.

When it is adsorbed and used as ink, a surfactant may be added. In this case, the surfactant is adsorbed on the porous particles only physically, so that the surfactant may be desorbed due to a change in the pH of the liquid medium. The desorption of the surfactant impairs the function as ink.

SUMMARY OF THE INVENTION

It is an object of the present invention to solve these problems. The inventors of the present invention found that when a hydrosol of fine particles comprising a metal oxide and a metal hydroxide having a nanometer particle size is reacted with a dye and an organic compound having an ionic group, fine colored particles having a nanometer size and a narrow particle size distribution that are coated with the organic compound can be obtained reliably and with a high reproducibility. Furthermore, such fine colored particles can be dispersed easily in either a nonpolar or a polar solvent and the dye is not eluded from the particles, so that a coloring liquid having good color properties, transparency and dispersion stability can be obtained. Thus, the inventors realized the present invention.

Thus, the present invention provides fine colored particles having excellent storage stability, transparency, high definition, color development properties, and coloring ability and thus has an excellent performance as a coloring material for ink jet ink.

The present invention relates to fine colored particles comprising a dye and a metal oxide, wherein the surface of the fine particles is coated with an organic compound having an ionic group (hereinafter, referred to as the fine colored particles of the present invention).

In a preferable embodiment, the metal oxide is a metal oxide hydrosol.

In a preferable embodiment, the surface of the fine particles and the ionic group interact electrically.

In a preferable embodiment, the organic compound having the ionic group is an ionic surfactant.

In a preferable embodiment, the electrical interaction is ionic bonding.

In a preferable embodiment, the surface of the fine particles is coated with the organic compound having the ionic group with the ionic group facing the surface of the particles, and further coated with a surfactant with its hydrophobic portion facing inward.

In a preferable embodiment, the CV value indicating a particle size distribution of the fine colored particles is 50% or less.

In a preferable embodiment, the CV value indicating a particle size distribution of the fine colored particles is 40% or less.

In a preferable embodiment, the CV value indicating a particle size distribution of the fine colored particles is 30% or less.

In a preferable embodiment, the metal oxide is selected from the group consisting of titanium oxide, aluminum oxide, zirconium oxide, iron oxide, tin oxide, zinc oxide, cerium oxide and mixtures of at least two of these oxides.

In a preferable embodiment, the dye is encapsulated in the metal oxide, or the dye is adsorbed on the surface of the metal oxide particles.

In a preferable embodiment, the average particle size of the fine colored particles is 1 nm to 500 nm.

In a more preferable embodiment, the average particle size of the fine colored particles is 3 nm to 250 nm.

In a preferable embodiment, the metal oxide is produced from a metal chloride, a metal hydroxide, a metal nitrate, a metal sulfate, or a metal acetate.

According to another aspect of the present invention, ink jet ink comprising the fine colored particles of the present invention and a liquid medium (hereinafter, referred to as an ink jet ink of the present invention).

In a preferable embodiment, the liquid medium used in the ink jet ink of the present invention is based on water or a hydrophilic organic solvent. The liquid medium is based on a hydrophobic organic solvent.

According to another aspect of the present invention, a first method for producing fine colored particles whose surface is coated with an organic compound having an ionic group includes (a) preparing an aqueous solution of at least one metal compound selected from the group consisting of a metal chloride, a metal hydroxide, a metal nitrate, a metal sulfate, and a metal acetate; (b) adjusting a pH of the aqueous solution of the metal compound so as to produce a hydrosol of fine particles comprising a metal oxide and a metal hydroxide; (c) adding an organic compound having an ionic group to the obtained hydrosol to effect an electrical interaction between the organic compound having an ionic group and the surface of the fine particles, and then transferring the fine particles to an organic solvent layer to produce an organosol; and (d) adding a dye to the organosol to adsorb the dye on the surface of the fine particles.

A second method for producing fine colored particles whose surface is coated with an organic compound having an ionic group includes (a) preparing an aqueous solution of at least one metal compound selected from the group consisting of a metal chloride, a metal hydroxide, a metal nitrate, a metal sulfate, and a metal acetate; (b) adjusting the pH of the aqueous solution of the metal compound and adding a dye thereto, so as to produce a hydrosol of fine particles comprising a metal oxide and a metal hydroxide on which the dye is adsorbed; and (c) adding an organic compound having an ionic group to the obtained hydrosol to effect an electrical interaction between the organic compound having an ionic group and the surface of the fine particles, and then transferring the fine particles to an organic solvent layer to produce an organosol.

A third method for producing fine colored particles whose surface is coated with an organic compound having an ionic group includes (a) preparing a mixed aqueous solution of a dye and at least one metal compound selected from the group consisting of a metal chloride, a metal hydroxide, a metal nitrate, a metal sulfate, and a metal acetate; (b) adjusting the pH of the mixed aqueous solution so as to produce a hydrosol of fine particles comprising a metal oxide and a metal hydroxide on which the dye is adsorbed; and (c) adding an organic compound having an ionic group to the obtained hydrosol to effect an electrical interaction between the organic compound having an ionic group and the surface of the fine particles, and then transferring the fine particles to an organic solvent layer to produce an organosol.

In a preferable embodiment, the method for producing fine colored particles according to any one of, further comprises treating the obtained fine colored particles with water or a hydrophilic organic solvent containing a surfactant.

According to another aspect of the present invention, a method for producing ink jet ink includes the steps of the method for producing the fine colored particles of the present invention and further includes (e) transferring the fine colored particles to a liquid medium based on water or a hydrophilic organic solvent or a liquid medium based on a hydrophobic organic solvent.

Thus, the present invention provides fine colored particles that can be dispersed easily in a wide range of solvent of nonpolar solvent to polar solvent and thus can provide a dispersion having excellent storage stability, transparency, color properties and coloring ability, and thus has excellent performance as a coloring material for ink jet ink.

These and other advantages of the present invention will become apparent to those skilled in the art upon reading and understanding the following detailed description.

DETAILED DESCRIPTION OF THE INVENTION

In the fine colored particles of the present invention, the surface of the fine particles comprising a dye and a metal oxide is coated with an organic compound having an ionic group.

The average particle size of the fine colored particles of the present invention is 1 nm to 500 nm, preferably 3 nm to 250 nm, and more preferably 5 nm to 100 nm. An average particle size of less than 1 nm causes problems with regard to the color properties and the light resistance. An average particle size of more than 500 nm may cause clogging of nozzles of ink jet heads in ink jet ink applications.

Furthermore, for the distribution of the particle size of the fine colored particles of the present invention, the value calculated from the equation: (standard deviation of the average particle size/average particle size)×100 (hereinafter, referred to as CV value) is 50% or less, preferably 40% or less, and more preferably 30% or less. A CV value of 50% or less improves the saturation further.

The particle size of the fine colored particles can be measured with a laser Doppler type device for measuring the particle size distribution, and a transmission electron microscope or the like.

There is no limitation regarding the dye that can be used in the present invention, and either a water-soluble or oil-soluble dye can be used.

When a water-soluble dye is used, it is preferable to select a dye based on the charges of the fine particles comprising metal oxide and metal hydroxide. More specifically, when the fine particles have positive charges, an acid dye is preferable. When the fine particles have negative charges, a basic dye is preferable.

Illustrative examples of the water-soluble dye used in the present invention include:

C.I. Acid Black 2, 7, 24, 26, 31, 52, 63, 112, and 118;

C.I. Acid Blue 9, 22, 40, 59, 93, 102, 104, 113, 117, 120, 167, 229, and 234;

C.I. Acid Red 1, 6, 32, 35, 37, 51, 52, 80, 85, 87, 92, 94, 115, 180, 256, 317, and 315;

C.I. Acid Yellow 11, 17, 23, 25, 29, 42, 61, and 71; and

C.I. Acid Orange 7, 19;

C.I. Basic Black 2;

C.I. Basic Blue 1, 3, 5, 7, 9, 24, 25, 26, 28, and 29;

C.I. Basic Red 1, 2, 9, 12, 13, 14, and 37;
C.I. Basic Yellow 2;
C.I. Basic Violet 7, 14, and 27;
C.I. Food Black 1 and 2; and
methyl red. These can be used alone or in combination of two or more.

Illustrative examples of the oil-soluble dye used in the present invention include:
C.I. Solvent Yellow 19;
C.I. Solvent Red 8, 24, 43, 48, and 73;
C.I. Solvent Blue 2, and 11;
C.I. Solvent Black 3;
C.I. Solvent Orange 3, 40, and 45;
C.I. Solvent Green 3 and 7; and
C.I. Solvent Violet 3. These can be used alone or in combination of two or more.

Examples of other dyes that can be used include:
C.I. Natural Green 3;
C.I. Natural Red 25;
C.I. Disperse Yellow 3 and 5;
C.I. Disperse Red 4;
C.I. Disperse Blue 3; and
C.I. Disperse Orange 13. These can be used alone or in combination of two or more.

It is preferable that the present invention comprises the dye in an amount of 1 to 80 parts by weight, more preferably 3 to 60 parts by weight, and most preferably 5 to 50 parts by weight, based on 100 parts by weight of the metal oxide. When the amount of the dye is less than 1 part by weight, sufficient coloring cannot be obtained. When the amount is more than 80 parts by weight, the dye that is not contained in fine particles becomes free.

Examples of the metal oxide that can be used in the present invention include titanium oxide, aluminum oxide, zirconium oxide, iron oxide, tin oxide, zinc oxide, and cerium oxide. The metal oxide is made into nanometer-sized fine particles using a method suitably selected by those skilled in the art such as mechanical pulverization, evaporative condensation, a gas phase reaction, precipitation or solvent evaporation.

As the metal oxide, a dispersion of a metal oxide and a metal oxide hydrosol also can be used. A metal oxide hydrosol can be prepared by, for example, hydrolyzing an aqueous solution of a metal salt. Here, "aqueous solution" refers to a solution using water or a mixed solution of water and a hydrophilic organic solvent as a solvent.

Examples of the metal salt include metal chlorides, metal hydroxides, metal nitrates, metal sulfates, and metal acetates. Specific examples thereof include the chlorides, nitrates, sulfates, and acetates of titanium, aluminum, zirconium, iron, tin, zinc and cerium.

When the fine colored particles are made by adjusting the pH as described later, the composition is a mixture of a metal oxide and a metal hydroxide.

The fine colored particles of the present invention can be obtained by preparing the fine particles by incorporating the dye into the metal oxide, for example by encapsulating the dye in the metal oxide or adsorbing the dye on the surface of the metal oxide particles, and then coating the fine particles with an organic compound having an ionic group.

First, a metal oxide is formed into nanometer-sized fine particles by a method suitably selected by those skilled in the art such as mechanical pulverization, evaporative condensation, a gas phase reaction, precipitation and solvent evaporation and the fine particles are dispersed in water to prepare a dispersion. Alternatively, a metal oxide hydrosol is prepared by hydrolyzing an aqueous solution of a metal salt. A dye is incorporated in the dispersion of the metal oxide or the metal oxide hydrosol, and the resultant is coated with an organic compound having an ionic group. Thus, the fine colored particles of the present invention can be obtained. The coating with an organic compound having an ionic group is achieved by an electrical interaction between the surfaces of the fine particles and the ionic group. The electrical interaction includes electostatic interaction and/or ionic bonding.

For example, the fine particles of the present invention that are produced with aluminum chloride, which is a metal chloride, will be described from the qualitative aspect. When a base is mixed with an aqueous solution of aluminum chloride and the pH is adjusted, nanometer order fine particles comprising oxide and hydroxide of aluminum are precipitated. Then, when an organic compound having, for example a sulfonic group is added to the system, an exchange reaction occurs between chlorine ions that remain on the surface of the produced particles and the organic compound having the sulfonic group. The balance is shifted towards promoting the exchange reaction under the conditions that deposit an exchange reaction product. As a result, the fine particles to which the organic compound having a sulfonic group are ionically bonded can be obtained as a deposit.

The particle surface of the colored particles obtained by such a process is stabilized by coating it with the organic compound, so that the colored particles can be redispersed easily in a liquid medium and maintain the nanometer order particle size and a narrow particle size distribution in the liquid medium. Thus, a stable coloring liquid that does not allow elution of the dye by an external change can be obtained.

Furthermore, the fine colored particles coated with an organic compound having an ionic group further can be coated with a surfactant. In this case, the fine colored particles are coated with an surfactant with the hydrophobic portion of the surfactant facing inward. Such a treatment can improve the dispersibility into a liquid medium that is based on water.

The fine colored particles further coated with a surfactant are included in the fine colored particles coated with an organic compound having an ionic group as used in the present invention.

The organic compound having an ionic group as used in the present invention can be expressed by the following formula:

where R is a linear, branched or cyclic saturated or unsaturated aliphatic hydrocarbon group having 6 to 20 carbon atoms, an aromatic hydrocarbon having 6 to 20 carbon atoms, an aromatic hydrocarbon group having a linear, branched or cyclic saturated or unsaturated hydrocarbon substituent having 6 to 20 carbon atoms, a phenol group, heterocyclic group, sugar chain, polyoxyethylene chain or polysiloxane chain having a branched or cyclic saturated or unsaturated hydrocarbon substituent having 6 to 20 carbon atoms or the like.

Examples of X include carboxyl groups, sulfonic groups, sulfate groups, phosphate groups, or salts of these, phosphonium salt groups, ammonium salt groups, pyridinium salt groups, and imidazolinium salt groups.

Illustrative examples of such an organic compound include alkyl carboxylic acid salts such as sodium laurate;

alkyl or alkylphenol sulfate salts such as sodium lauryl sulfate; alkyl or alkylbenzene sulfonic acid salts such as sodium lauryl benzene sulfonate; alkylphosphate ester salts such as sodium lauryl phosphate ester; quaternary ammonium salts such as lauryl dimethyl ammonium chloride; and succinic acid polyoxyethylene monoester sodium salt.

The fine particles can be coated with the organic compound having an ionic group by adding 10 to 30 parts by weight of the organic compound having an ionic group, for example having a 5 to 20% concentration, to 100 parts by weight of the dispersion of the metal oxide and the metal hydroxide into which the dye is incorporated. Thus, the fine colored particles of the present invention can be obtained.

Then, the fme colored particles of the present invention are recovered, and are dried at 40 to 100° C., for example 70° C., for example with a vacuum dryer.

The fine colored particles coated with the organic compound having an ionic group with the ionic group facing the surface of the particles, and further coated with the surfactant with its hydrophobic portion facing inward can be obtained by treating the fine colored particles coated with the organic compound having an ionic group with water or a hydrophilic organic solvent into which the surfactant has been added. The thus obtained fine colored particles can be used preferably for aqueous or hydrophilic ink.

Illustrative examples of the surfactant to be added include ionic surfactants and nonionic surfactants. Examples of ionic surfactants include alkyl carboxylic acid salts such as sodium laurate; alkyl or alkylphenol sulfate salts such as sodium lauryl sulfate; alkyl or alkylbenzene sulfonic acid salts such as sodium dodecyl sulfonate and sodium dodecyl benzene sulfonate; alkylphosphate ester salts such as sodium lauryl phosphate ester; quaternary ammonium salts such as lauryl dimethyl ammonium chloride and hexadecyltrimethyl ammonium chloride; alkylbetaines such as lauryl dimethyl acetic acid betaine, and 2-undecyl-N-carboxymethyl-N-hydroxyethyl imidazolinium betaine; as well as an alkyl pyridinium salts; and alkyl amino acid salts.

Examples of nonionic surfactants include glycerin monostearate, sorbitan stearate, sucrose stearate, polyoxyethylene oleyl ether, polyoxyethylene nonyl phenol ether, and dodecylpolyoxyethylene ether.

The coating with the surfactant is performed by treating the fine colored particles, whose surface is coated with the organic compound having an ionic group, with water or a hydrophilic organic solvent containing a surfactant having a concentration of, for example 5 to 20%.

Hereinafter, a method for producing the fine colored particles whose surface is coated with the organic compound having an ionic group will be described. First, a first method includes the following steps:

(a) preparing an aqueous solution of at least one metal compound selected from the group consisting of a metal chloride, a metal hydroxide, a metal nitrate, a metal sulfate, and a metal acetate;

(b) adjusting the pH of the aqueous solution of the metal compound so as to produce a hydrosol of fine particles comprising a metal oxide and a metal hydroxide;

(c) adding an organic compound having an ionic group to the obtained hydrosol to effect an electrical interaction between the organic compound having an ionic group and the surface of the fine particles, and then transferring the fine particles to an organic solvent layer to produce an organosol; and (d) adding a dye to the organosol and adsorbing the dye on the surface of the fine particles.

A second method includes the following steps:

(a) preparing an aqueous solution of at least one metal compound selected from the group consisting of a metal chloride, a metal hydroxide, a metal nitrate, a metal sulfate, and a metal acetate;

(b) adjusting the pH of the aqueous solution of the metal compound and adding a dye thereto, so as to produce a hydrosol of fine particles comprising a metal oxide and a metal hydroxide on which the dye is adsorbed; and (c) adding an organic compound having an ionic group to the obtained hydrosol to effect an electrical interaction between the organic compound having an ionic group and the surface of the fine particles, and then transferring the fine particles to an organic solvent layer to produce an organosol.

A third method includes the following steps:

(a) preparing a mixed aqueous solution of a dye and at least one metal compound selected from the group consisting of a metal chloride, a metal hydroxide, a metal nitrate, a metal sulfate, and a metal acetate;

(b) adjusting the pH of the mixed aqueous solution so as to produce a hydrosol of fine particles comprising a metal oxide and a metal hydroxide on which the dye is adsorbed; and (c) adding an organic compound having an ionic group to the obtained hydrosol to effect an electrical interaction between the organic compound having an ionic group and the surface of the fine particles, and then transferring the fine particles to an organic solvent layer to produce an organosol.

Furthermore, the fine colored particles coated with the organic compound having an ionic group with the ionic group facing the surface of the particles, and further coated with the surfactant with its hydrophobic portion facing inward can be obtained by further treating the fine colored particles obtained by either one of the above methods with water or a hydrophilic organic solvent containing the surfactant.

Whether or not the obtained fine colored particles are coated with the organic compound having an ionic group can be determined in the following manner. For example, the obtained fine colored particles are dispersed in an amphipathic solvent such as alcohol, and the particles are recovered by centrifugation. Then, organic components that remain in the liquid are analyzed by an analytical technique such as gas chromatography or liquid chromatography. If this organic compound is ionically bonded, the presence of the organic compound having an ionic group can hardly be confirmed in the solvent. If the organic compound having an ionic group is adsorbed only physically and is present on the surface of the particles, the organic compound is eluded in the solvent so that its presence can be confirmed clearly.

Furthermore, a method of measuring the zeta-potential or a method of measuring with a solid NMR can be used as well.

The ink jet ink of the present invention includes the fine colored particles and a liquid medium and is obtained by dispersing the fine colored particles in a liquid medium.

In the ink jet ink of the present invention, the content of the fine particles is preferably about 0.5 to 80% by weight, more preferably about 2 to 60% by weight with respect to the total weight of the ink.

A preferable liquid medium used for the ink jet ink of the present invention is a mixed solvent of water and a hydrophilic organic solvent. Preferable water is deionized water rather than regular water containing various ions.

Examples of the hydrophilic organic solvent mixed with water for use include alkyl alcohols having 1 to 4 carbon atoms such as methyl alcohol, ethyl alcohol, n-propyl alcohol, isopropyl alcohol, nbutyl alcohol, sec-butyl alcohol, tert-butyl alcohol, and isobutyl alcohol; amides such as dimethyl formamide and dimethyl acetamide; ketones or ketone alcohols such as acetone and diacetone alcohol; ethers such as tetrahydrofuran and dioxane; polyalkylene glycols such as polyethylene glycol and polypropylene glycol; alkylene glycols where the alkelene group has 2 to 6 carbon atoms such as ethylene glycol, propylene glycol, butylene glycol, triethylene glycol, 1,2,6-hexane triol, thiodiglycol, hexylene glycol, and diethylene glycol; glycerin; lower alkyl ethers of polyhydric alcohols such as ethylene glycol methyl (or ethyl) ether, diethylene glycol methyl (or ethyl) ether, and triethylene glycol monomethyl (or ethyl) ether; N-methyl-2-pyrolidone, and 1,3-dimethyl-2-imidazolidine.

The most preferable hydrophilic organic solvent is a solvent containing a polyhydric alcohol having the effect of preventing the ink from drying. In particular, polyhydric alcohols such as diethylene glycol, or lower alkyl ethers of polyhydric alcohol such as triethylene glycol monomethyl (or ethyl) ether are preferable.

The content of the hydrophilic organic solvent in the ink jet ink of the present invention is preferably 9 to 80% by weight, more preferably 20 to 50% by weight of the total weight of the ink.

The content of the hydrophilic organic solvent can be determined in a wide range, depending on the type or the composition of the soluble organic solvent or the required properties of the ink. Preferably, it is about 10 to 90% by weight, more preferably about 10–70 wt %, most preferably about 20 to 70% by weight of the total weight of the ink.

Other than those components as described above, the ink jet ink of the present invention may contain a dispersant, a surfactant, a viscosity modifier, a surface tension modifier or the like that can be used by those skilled in the art, if necessary.

The ink jet ink of the present invention may be obtained by separating the fine colored particles obtained by one of the above methods and then dispersing them in a desired solvent. Alternatively, the ink jet ink can be produced directly without separating the fine colored particles. For example, after the last process of the first, second or third method for producing the fine colored particles, a process of moving the fine colored particles to a liquid medium used for ink jet ink (a liquid medium based on water or a hydrophilic organic solvent or a liquid medium based on a hydrophobic organic solvent) is added. Thus, the ink jet ink of the present invention can be produced.

Furthermore, ink jet ink containing the fine colored particles coated with the organic compound having an ionic group with the ionic group facing the surface of the particles, and further coated with the surfactant with its hydrophobic portion facing inward can be obtained by treating the fine colored particles obtained by either one of the above methods with water or a hydrophilic organic solvent containing a further surfactant without separating the fine colored particles, and then transferring the fine colored particles to a liquid medium used for ink jet ink (a liquid medium based on water or a hydrophilic organic solvent or a liquid medium based on a hydrophobic organic solvent).

Illustrative examples of a substrate that can be used for the ink jet ink of the present invention include regular paper, coated paper, synthetic paper, and various types of plastic films.

EXAMPLES

Hereinafter, the present invention will be described by way of examples, although the present invention is not limited thereto.

Example 1

Production of Fine Colored Particles

About 12 ml of 10%-$Na_2CO_3$ aqueous solution were mixed with 100 ml of 5%-$TiCl_4$ aqueous solution, and the pH of the solution was adjusted to 1.2 to 1.3. Thus, a titanium oxide hydrosol was prepared. About 30 ml of an aqueous solution of 2%-sodium dodecyl benzene sulfonate (SDS) were mixed with the aqueous dispersion of the titanium oxide hydrosol, so that a titanium oxide organosol where the surfactant was adsorbed densely on the surface of the hydrosol was prepared. Then, a $TiO_2$-SDS organosol separated from the water phase was recovered and dried at 70° C. in a vacuum dryer, so that $TiO_2$-SDS particles were obtained.

Then, 50 mg of Methyl Red (MR) as a dye were mixed with 10 ml of a 10% toluene dispersion of the $TiO_2$-SDS particles so that the MR was adsorbed on the surface of the $TiO_2$-SDS particles. The resultant was allowed to stand for 30 minutes, and methanol was added to the toluene dispersion so as to reprecipitate the $TiO_2$-SDS/MR adsorbent. Thus, the fine colored particles of the present invention were obtained.

The particles of the present invention were dispersed easily in a wide range of solvent of nonpolar solvent to polar solvent such as toluene, ethylene glycol diethyl ether, and tetrahydrofuran. The toluene dispersion was transparent, and there was no precipitate or turbidity after one month storage. When the particle size distribution in the toluene dispersion was measured with a laser Doppler type device for measuring the particle size distribution, the average particle size was 74.1 nm, and the CV value was 12.28%.

Example 2

Production of Fine Colored Particles

About 12 ml of 10%-$Na_2CO_3$ aqueous solution were mixed with 100 ml of 5%-$TiCl_4$ aqueous solution, and the pH of the solution was adjusted to 1.2 to 1.3. Thus, a titanium oxide hydrosol was prepared. Then, 50 mg of C.I. Basic Blue 26 were added and adsorbed on the oxide hydrosol. Then, about 30 ml of an aqueous solution of 2%-SDS was added to prepare a $TiO_2$-SDS organosol/dye adsorbent. Then, the $TiO_2$-SDS organosol/dye adsorbent separated from the water phase was recovered and dried at 70° C. in a vacuum dryer, so that the particles of the present invention were obtained.

The particles of the present invention were dispersed easily in a wide range of solvent of nonpolar solvent to polar solvent such as toluene, ethylene glycol diethyl ether, and tetrahydrofuran. The toluene dispersion was transparent, and there was no precipitate or turbidity after one month storage. When the particle size distribution in the toluene dispersion was measured with a laser Doppler type device for measuring the particle size distribution, the average particle size was 10.2 nm, and the CV value was 12.08%. The content of the dye was 4% by weight.

Example 3

Production of Fine Colored Particles

About 4 ml of 10%-$Na_2CO_3$ aqueous solution were mixed with 100 ml of 10%-$AlCl_3.6H_2O$ aqueous solution, and the pH of the solution was adjusted to 3.0 to 4.0. Thus, an alumina hydrosol was prepared. Then, 50 mg of C.I. Basic Red 1 were added thereto and adsorbed on the oxide hydrosol. Then, about 30 ml of an aqueous solution of 2%-SDS was added to prepare a $Al_2O_3$-SDS organosol/dye adsorbent. Then, the $Al_2O_3$-SDS organosol/dye adsorbent separated from the water phase was recovered and dried at 70° C. in a vacuum dryer, so that the particles of the present invention were obtained.

The particles of the present invention were dispersed easily in a wide range of solvent of nonpolar solvent to polar solvent such as toluene, ethylene glycol diethyl ether, and tetrahydrofuran. The toluene dispersion was transparent, and there was no precipitate or turbidity after one month storage. When the particle size distribution in the toluene dispersion was measured with a laser Doppler type device for measuring the particle size distribution, the average particle size was 12.5 nm, and the CV value was 47.59%. The content of the dye was 6% by weight.

Example 4

Production of Fine Colored Particles

About 80 ml of 1N-HCl aqueous solution were mixed with 100 ml of 2%-$Al(OH)_3$/10%KOH aqueous solution, and the pH of the solution was adjusted to 8.0 to 9.0. Thus, an alumina hydrosol was prepared. Then, 50 mg of C.I. Acid Blue 40 were added thereto and adsorbed on the oxide hydrosol. Then, about 100 ml of an aqueous solution of 2%-hexadecyl trimethyl ammonium chloride (HTAC) was added to prepare a $Al_2O_3$-HTAC organosol/dye adsorbent. Then, the $Al_2O_3$-HTAC organosol/dye adsorbent separated from the water phase was recovered and dried at 70° C. in a vacuum dryer, so that the particles of the present invention were obtained.

The particles of the present invention were dispersed easily in a wide range of solvent of nonpolar solvent to polar solvent such as toluene, ethylene glycol diethyl ether, and tetrahydrofuran. The toluene dispersion was transparent, and there was no precipitate or turbidity after one month storage. When the particle size distribution in the toluene dispersion was measured with a laser Doppler device for measuring the particle size distribution, the average particle size was 8.3 nm, and the CV value was 46.41%. The content of the dye was 7% by weight.

This toluene dispersion of the fine colored particles was used as the ink of the present invention. This ink was filled in an ink tank of a modified printer of an ink jet printer (PM-750C manufactured by Seiko Epson Corporation) and a discharge test was conducted. The ink of the present invention was normally discharged and was found to be suitable as an ink for ink jet printers. The thickness of printed letters was comparable to that of the original ink for the printer. Furthermore, there was little bleeding of the ink of the present invention on paper and it was found that the water resistance was excellent.

Example 5

Production of Aqueous Ink for Ink Jet Recording

First, 0.75 g of the fine colored particles produced in Example 2 was dispersed in 2.0 g of tetraethylene glycol monobutyl ether, and the dispersion was mixed with a mixed solution of 15 g of deionized water, 2.5 g of glycerin, and 2.2 g of diethylene glycol, and thus the ink jet ink of the present invention was obtained.

When the particle size distribution in the ink was measured with a laser Doppler type device for measuring the particle size distribution, the average particle size was 25 nm.

This ink was filled in an ink tank of an ink jet printer (PM-750C manufactured by Seiko Epson Corporation) and a discharge test was conducted. The ink of the present invention was normally discharged and was found to be suitable as an ink for ink jet printers. The thickness of printed letters was comparable to that of the original ink for the printer. Furthermore, there was little bleeding of the ink of the present invention on paper and it was found that the water resistance was excellent.

Example 6

Production of Aqueous Ink for Ink Jet Recording

About 12 ml of 10%-$Na_2CO_3$ aqueous solution were mixed with 100 ml of 5%-$TiCl_4$ aqueous solution, and the pH of the solution was adjusted to 1.2 to 1.3. Thus, a titanium oxide hydrosol was prepared. Then, 50 mg of C.I. Basic Blue 26 were added and adsorbed on the oxide hydrosol. Then, about 30 ml of an aqueous solution of 2% SDS were added to prepare a $TiO_2$-SDS organosol/dye adsorbent. Then, the $TiO_2$-SDS organosol/dye adsorbent was extracted with toluene from this aqueous solution, washed with water, and then concentrated, so that a toluene solution of the $TiO_2$-SDS organosol/dye adsorbent was obtained.

This solution was added to 10 ml of 0.5% SDS aqueous solution and a dispersion treatment was performed with an ultrasonic homogenizer. The dispersion was stirred over night at room temperature, and then a coloring liquid having good transparency was obtained. A mixture of 10 g of deionized water, 2.5 g of glycerin, and 2.2 g of diethylene glycol was added to the coloring liquid. Thus, the ink jet ink of the present invention was obtained. When the particle size distribution in the toluene dispersion was measured with a laser Doppler type device for measuring the particle size distribution, the average particle size was 71 nm. The thickness of printed letters was comparable to that of the original ink for the printer. Furthermore, there was little bleeding of the ink of the present invention on paper and it was found that the water resistance was excellent.

Examples 7 to 9

Production of Fine Colored Particles and Ink Jet Ink

Three types of fine colored particles were produced in the same manner as in Example 3 except that the amount of a $Na_2CO_3$ aqueous solution to be added to a $AlCl_3.6H_2O$ aqueous solution was changed, the pH of the solution was adjusted to 2.5, 3.0 and 4.0, and the times at which a dye and SDS aqueous solution were added were adjusted for each example (the pH is the smallest in Example 7 and the largest in Example 9).

Aqueous ink for ink jet ink recording was produced with the obtained fine colored particles of Examples 7 to 9 and 3. First, 0.75 g of each type of the fine colored particles was dispersed in 2.0 g of tetraethylene glycol monobutyl ether, which is a nonionic surfactant, and the dispersion was added to a mixed solution of 15 g of deionized water, 2.5 g of glycerin, and 2.2 g of diethylene glycol, and thus the ink jet ink of the present invention was obtained.

When the particle size distribution in the ink was measured with a laser Doppler type device for measuring the particle size distribution, the average particle size of the fine colored particles of Example 3 was 14.4 nm, and the CV value was 49.59%. The average particle size of the fine colored particles of Example 7 was 18.34 nm, and the CV value was 56.39%. The average particle size of the fine colored particles of Example 8 was 14.2 nm, and the CV value was 34.54%. The average particle size of the fine colored particles of Example 9 was 13.2 nm, and the CV value was 21.17%.

Each of the obtained inks of these examples was filled in an ink tank of an ink jet printer (PM-750C manufactured by Seiko Epson Corporation) and a discharge test was conducted. The ink of the present invention was normally discharged and was found to be suitable as an ink for ink jet printers. The thickness of printed letters was comparable to that of the original ink for the printer. Furthermore, there was little bleeding of the ink of the present invention on paper and it was found that the water resistance was excellent.

Furthermore, the saturation of these inks was visually evaluated with samples printed on a recording paper and an OHP sheet. The results revealed that all the printed samples of the inks have a sufficient saturation for practical use. In particular, the saturation of the printed sample of the fine colored particle of Example 9 was the highest. The saturation of the printed sample of the fine colored particle of Example 8 was the second highest. The saturations of Examples 3 and 7 were in the same level for recording paper, whereas the saturation of Example 3 was higher for OHP sheets. It is believed that such a difference in the saturation is due to the particle size distribution (CV value).

Furthermore, when the sample printed on the OHP sheet was projected with a projector and evaluated, in particular, the thickness of the samples of Examples 9, 8 and 3 was high and clear.

According to the present invention, a nanometer size fine colored particle that can disperse easily in both nonpolar solvent and polar solvent so as to prepare a dispersion having excellent storage stability, transparency, color development properties, and coloring ability, and thus has an excellent performance as a coloring material for ink jet ink.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. Fine colored particles having a nanometer particle size comprising:
    (i) a particle comprising a dye, a metal oxide, and a metal hydroxide, and
    (ii) an organic compound coating the surface of the particle (i), wherein the organic compound has an ionic group and a hydrophobic group, and the ionic group faces the surface of the particle (i), and the hydrophobic group faces away from the surface of the particle (i), and
    the fine colored particles are able to disperse in a hydrophobic organic solvent.

2. The fine colored particles according to claim 1, which are obtained from an organosol.

3. The fine colored particles according to claim 1, further comprising (iii) a surfactant having a hydrophobic group and a hydrophilic group;
    wherein the particle (i) that is coated with the organic compound is further coated with the surfactant (iii), and wherein the hydrophobic group of the surfactant (iii) faces the surface of the particle (i), and the hydrophilic group of the surfactant (iii) faces away from the surface of the particle (i), and
    wherein the fine colored particles are able to disperse in water.

4. The fine colored particles according to claim 1, wherein the surface of the fine particle (i) and the ionic group interact electrically.

5. The fine colored particles according to claim 4, wherein the electrical interaction is ionic bonding.

6. The fine colored particles according to claim 1, wherein the organic compound has a structure represented by the following formula:

R—X wherein R includes the hydrophobic group and X includes the ionic group, and
wherein R is a linear, branched or cyclic saturated or unsaturated aliphatic hydrocarbon group having 6 to 20 carbon atoms, an aromatic hydrocarbon having 6 to 20 carbon atoms, an aromatic hydrocarbon group having a linear, branched or cyclic saturated or unsaturated hydrocarbon substituent having 6 to 20 carbon, a phenol group, heterocyclic group, sugar chain, polyoxyethylene chain or polysiloxane chain having a branched or cyclic saturated or unsaturated hydrocarbon substituent having 6 to 20 carbon atoms.

7. The fine colored particles according to claim 1, wherein a CV value indicating a particle size distribution of the fine colored particles is 50% or less.

8. The fine colored particles according to claim 7, wherein the CV value is 40% or less.

9. The fine colored particles according to claim 8, wherein the CV value is 30% or less.

10. The fine colored particles according to claim 1, wherein the metal oxide is selected from the group consisting of titanium oxide, aluminum oxide, zirconium oxide, iron oxide, tin oxide, zinc oxide, cerium oxide and mixtures thereof.

11. The fine colored particles according to claim 1, wherein the dye is encapsulated in the metal oxide and the metal hydroxide, or the dye is adsorbed on the surface of a particle comprising the metal oxide and the metal hydroxide.

12. The fine colored particles according to claim 1, wherein the average particle size of the fine colored particles is 1 nm to 500 nm.

13. The fine colored particles according to claim 12, wherein the average particle size of the fine colored particles is 3 nm to 250 nm.

14. Ink jet ink comprising the fine colored particles according to claim 1 and a liquid medium.

15. The ink jet ink according to claim 14, wherein the liquid medium is based on a hydrophobic organic solvent.

16. Ink jet ink comprising the fine colored particles according to claim 3 and a liquid medium based on water or a hydrophilic organic solvent.

17. A method for producing the fine colored particles of claim 1 comprising:
    (a) preparing an aqueous solution of at least one metal compound selected from the group consisting of a metal chloride, a metal hydroxide, a metal nitrate, a metal sulfate, and a metal acetate;
    (b) adjusting the pH of the aqueous solution of the metal compound so as to produce a hydrosol of fine particles comprising a metal oxide and a metal hydroxide;

(c) adding an organic compound having an ionic group to the obtained hydrosol to effect an electrical interaction between the organic compound having an ionic group and the surface of the fine particles, and then transferring the fine particles to an organic solvent layer to produce an organosol;

(d) adding a dye to the organosol to adsorb the dye on the surface of the fine particles, so as to produce fine colored particles; and (e) separating the produced fine colored particles from the organosol.

18. A method for producing the fine colored particles of claim 1, comprising:

(a) preparing an aqueous solution of at least one metal compound selected from the group consisting of a metal chloride, a metal hydroxide, a metal nitrate, a metal sulfate, and a metal acetate;

(b) adjusting the pH of the aqueous solution of the metal compound and adding a dye thereto, so as to produce a hydrosol of fine particles comprising a metal oxide and a metal hydroxide on which the dye is adsorbed;

(c) adding an organic compound having an ionic group to the obtained hydrosol to effect an electrical interaction between the organic compound and the surface of the fine particles, and then transferring the fine particles to an organic solvent layer to produce an organosol containing fine colored particles; and (d) separating the fine colored particles from the organosol.

19. A method for producing the fine colored particles of claim 1, comprising:

(a) preparing a mixed aqueous solution of a dye and at least one metal compound selected from the group consisting of a metal chloride, a metal hydroxide, a metal nitrate, a metal sulfate, and a metal acetate;

(b) adjusting the pH of the mixed aqueous solution so as to produce a hydrosol of fine particles comprising a metal oxide and a metal hydroxide on which the dye is adsorbed;

(c) adding an organic compound having an ionic group to the obtained hydrosol to effect an electrical interaction between the organic compound having an ionic group and the surface of the fine particles, then transferring the fine particles to an organic solvent layer to produce an organosol containing fine colored particles; and (d) separating the fine colored particles from the organosol.

20. A method for producing the fine colored particles of claim 3, comprising:

(a) preparing an aqueous solution of at least one metal compound selected from the group consisting of a metal chloride, a metal hydroxide, a metal nitrate, a metal sulfate, and a metal acetate;

(b) adjusting the pH of the aqueous solution of the metal compound so as to produce a hydrosol of fine particles comprising a metal oxide and a metal hydroxide;

(c) adding an organic compound having an ionic group to the obtained hydrosol to effect an electrical interaction between the organic compound having an ionic group and the surface of the fine particles, and then transferring the fine particles to an organic solvent layer to produce an organosol;

(d) adding a dye to the organosol to adsorb the dye on the surface of the fine particles, resulting in fine colored particles;

(e) separating the fine colored particles from the organosol;

(f) treating the fine colored particles obtained in step (e) with water containing a surfactant or a hydrophilic organic solvent containing a surfactant; and (g) drying the treated fine colored particles obtained in step (f).

21. A method for producing the fine colored particles of claim 3, comprising:

(a) preparing an aqueous solution of at least one metal compound selected from the group consisting of a metal chloride, a metal hydroxide, a metal nitrate, a metal sulfate, and a metal acetate;

(b) adjusting the pH of the aqueous solution of the metal compound and adding a dye thereto, so as to produce a hydrosol of fine particles comprising a metal oxide and a metal hydroxide on which the dye is adsorbed;

(c) adding an organic compound having an ionic group to the obtained hydrosol to effect an electrical interaction between the organic compound and the surface of the fine particles, then transferring the fine particles to an organic solvent layer to produce an organosol containing fine colored particles;

(d) separating the fine colored particles from the organosol;

(e) treating the fine colored particles obtained in step (e) with water containing a surfactant or a hydrophilic organic solvent containing a surfactant; and (f) drying the treated fine colored particles obtained in step (f).

22. A method for producing the fine colored particles of claim 3, comprising:

(a) preparing a mixed aqueous solution of a dye and at least one metal compound selected from the group consisting of a metal chloride, a metal hydroxide, a metal nitrate, a metal sulfate, and a metal acetate;

(b) adjusting the pH of the mixed aqueous solution so as to produce a hydrosol of fine particles comprising a metal oxide and a metal hydroxide on which the dye is adsorbed;

(c) adding an organic compound having an ionic group to the obtained hydrosol to effect an electrical interaction between the organic compound having an ionic group and the surface of the fine particles, then transferring the fine particles to an organic solvent layer to produce an organosol containing fine colored particles;

(d) separating the fine colored particles from the organosol;

(e) treating the fine colored particles obtained in step (d) with water containing a surfactant or a hydrophilic organic solvent containing a surfactant; and (f) drying the treated fine colored particles obtained in step (e).

23. A method for producing ink jet ink comprising:

(a) providing the fine colored particles obtained by the method of claim 17, and (b) dispersing the fine colored particles in a hydrophobic organic solvent.

24. A method for producing ink jet ink comprising:

(a) providing the fine colored particles obtained by the method of claim 18, and (b) dispersing the fine colored particles in a hydrophobic organic solvent.

25. A method for producing ink jet ink comprising:
(a) providing the fine colored particles obtained by the method of claim 19, and
(b) dispersing the fine colored particles in a hydrophobic organic solvent.

26. A method for producing ink jet ink comprising:
(a) providing the fine colored particles obtained by the method of claim 20, and
(b) dispersing the fine colored particles in water or a hydrophilic organic solvent.

27. A method for producing ink jet ink comprising:
(a) providing the fine colored particles obtained by the method of claim 21, and
(b) dispersing the fine colored particles in water or a hydrophilic organic solvent.

28. A method for producing ink jet ink comprising:
(a) providing the fine colored particles obtained by the method of claim 22, and
(b) dispersing the fine colored particles in water or a hydrophilic organic solvent.

29. The fine colored particles according to claim 1, wherein the average particle size thereof ranges from 1 nm to 500 nm.

30. The fine colored particles according to claim 29, wherein the average particle size thereof ranges from 3 nm to 250 nm.

31. The fine colored particles according to claim 30, wherein the average particle size thereof ranges from 5 nm to 100 nm.

\* \* \* \* \*

UNITED STATES PATENT AND TRADEMARK OFFICE
CERTIFICATE OF CORRECTION

PATENT NO.     : 6,527,843 B1
DATED          : March 4, 2003
INVENTOR(S)    : Hiroaki Zaima et al.

It is certified that error appears in the above-identified patent and that said Letters Patent is hereby corrected as shown below:

<u>Column 3,</u>
Line 67, after "any one of" insert -- the methods of the present invention --.

<u>Column 7,</u>
Line 13, "Then, the fme" should read -- Then, the fine --

Signed and Sealed this

Eighth Day of July, 2003

JAMES E. ROGAN
*Director of the United States Patent and Trademark Office*